US009163577B2

(12) United States Patent
Sakayori et al.

(10) Patent No.: US 9,163,577 B2
(45) Date of Patent: Oct. 20, 2015

(54) MALFUNCTION DIAGNOSIS DEVICE AND MALFUNCTION DIAGNOSIS METHOD FOR KNOCK SENSOR

(75) Inventors: Yosuke Sakayori, Sagamihara (JP); Satoshi Sekine, Fujisawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 2 days.

(21) Appl. No.: 14/355,336

(22) PCT Filed: Sep. 7, 2012

(86) PCT No.: PCT/JP2012/072863

§ 371 (c)(1),
(2), (4) Date: Apr. 30, 2014

(87) PCT Pub. No.: WO2013/065400

PCT Pub. Date: May 10, 2013

(65) Prior Publication Data

US 2014/0288762 A1 Sep. 25, 2014

(30) Foreign Application Priority Data

Nov. 1, 2011 (JP) ................................. 2011-239902

(51) Int. Cl.

| | |
|---|---|
| ***G06F 19/00*** | (2011.01) |
| ***F02D 41/22*** | (2006.01) |
| ***F02D 41/12*** | (2006.01) |
| ***F02D 35/02*** | (2006.01) |
| *F02D 41/08* | (2006.01) |
| *F02D 41/00* | (2006.01) |
| *F02D 41/04* | (2006.01) |
| *F02N 11/08* | (2006.01) |

(52) U.S. Cl.
CPC ............ *F02D 41/222* (2013.01); *F02D 35/027* (2013.01); *F02D 41/123* (2013.01); *F02D 41/009* (2013.01); *F02D 41/042* (2013.01); *F02D 41/08* (2013.01); *F02D 2041/228* (2013.01); *F02D 2200/602* (2013.01); *F02N 11/0814* (2013.01)

(58) Field of Classification Search
None
See application file for complete search history.

(56) References Cited

U.S. PATENT DOCUMENTS 7,263,430 B2 8/2007 Kasashima et al.
2005/0098156 A1 5/2005 Ohtani

FOREIGN PATENT DOCUMENTS

| | | | |
|---|---|---|---|
| JP | 2005-146924 | A | 6/2005 |
| JP | 2005-330954 | A | 12/2005 |
| JP | 2009-209865 | A | 9/2009 |
| JP | 2009-215930 | A | 9/2009 |
| JP | 2010-265757 | A | 11/2010 |
| JP | 2011-174409 | A | 9/2011 |

*Primary Examiner* — Thomas Tarcza
*Assistant Examiner* — Garrett Evans
(74) *Attorney, Agent, or Firm* — Drinker Biddle & Reath LLP

(57) ABSTRACT

To enable, with a simple control, a malfunction of a type wherein the output from a knock sensor becomes excessively large to be detected, a knock-sensor malfunction diagnosis device includes a control section configured to determine that knocking has occurred when the magnitude of a knocking vibration frequency component derived from an output signal from a knock sensor exceeds a first threshold value, and diagnose the knock sensor as malfunctioning when a prescribed diagnostic condition wherein knocking cannot occur is satisfied and the magnitude of the knocking vibration frequency component derived from the output signal from the knock sensor exceeds a second threshold value. The control section is further configured to determine that the diagnostic condition is satisfied for a time interval from a time when a predetermined time period has expired after fuel-cutoff has started to a time when the fuel-cutoff ends, during execution of the fuel-cutoff.

9 Claims, 8 Drawing Sheets

MALFUNCTION DIAGNOSIS DEVICE AND MALFUNCTION DIAGNOSIS METHOD FOR KNOCK SENSOR

TECHNICAL FIELD

The present invention relates to a diagnosis of a malfunction in a knock sensor that detects vibrations of an internal combustion engine.

BACKGROUND ART

In a prior-art knock-sensor malfunction diagnosis device disclosed in Patent document 1, vibrations, which are generated due to seating of each of intake and exhaust valves, are detected by a knock sensor, and a diagnosis that the knock sensor is malfunctioning is made when the magnitude of a prescribed frequency component of the detected signal is less than a predetermined signal value and thus there is no detection of the vibration caused by the valve seating.

CITATION LIST

Patent Literature

Patent document 1: Japanese patent provisional publication No. 2010-265757 (A)

SUMMARY OF INVENTION

Technical Problem

However, in the prior art device as described previously, when there is no detection of vibration caused by the seating, it is determined that the sensor is malfunctioning. Thus, it is impossible to detect a malfunction of a type wherein the output from the knock sensor becomes larger than the magnitude of the frequency component of vibration actually occurring.

Solution to Problem

It is, therefore, in view of the previously-described drawbacks of the prior art, the present invention is characterized in that it is determined that knocking has occurred when the magnitude of a knocking vibration frequency component derived from an output signal of a knock sensor exceeds a first threshold value, and that it is determined whether a prescribed diagnostic condition wherein knocking cannot occur is satisfied and then a diagnosis that the knock sensor is malfunctioning is made when the prescribed diagnostic condition is satisfied and the magnitude of the knocking vibration frequency component derived from the output signal of the knock sensor exceeds a second threshold value.

Advantageous Effects of Invention

According to the invention, when the magnitude of the knocking vibration frequency component derived from the output signal of the knock sensor exceeds the second threshold value under the prescribed diagnostic condition wherein knocking cannot occur, a diagnosis that the knock sensor is malfunctioning is made. Hence, it is possible to detect a malfunction/failure of a type wherein the output from the knock sensor becomes excessively large. Also, it is possible to apply almost the same control processing as the normal knocking-occurrence detection processing that uses the first threshold value to the malfunction-diagnosis processing that uses the second threshold value. Hence, it is possible to carry out such a malfunction diagnosis with a very simple control logic.

DESCRIPTION OF EMBODIMENTS

Figure 1:
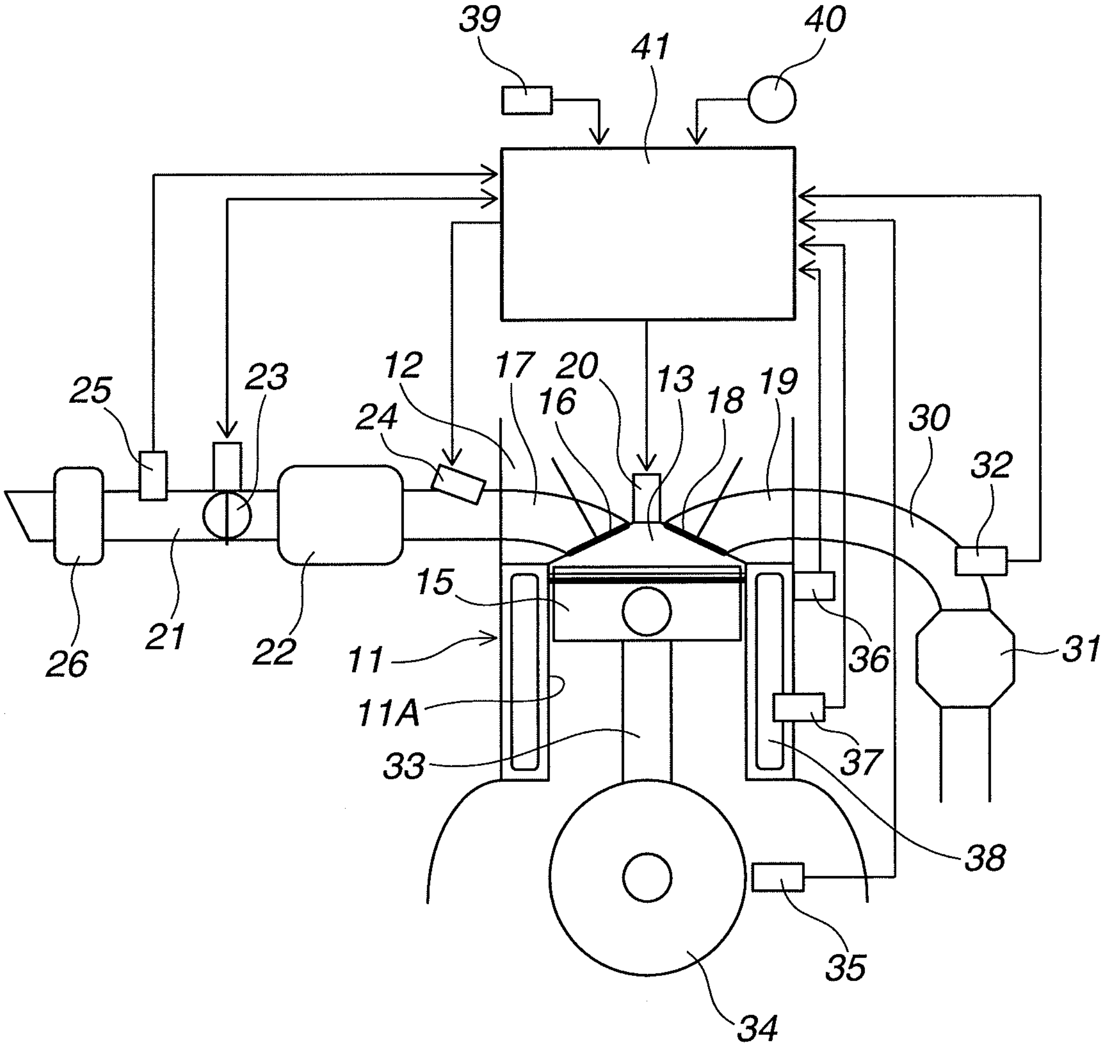
FIG. 1 is a system block diagram illustrating the system configuration of an internal combustion engine to which the first embodiment of the invention can be applied.

Preferred embodiments of the invention are hereinafter described in reference to the drawings. First, the first embodiment of the invention is hereunder explained in reference to FIGS. 1-3. FIG. 1 is the system block diagram illustrating the system configuration of a port-injection type spark-ignited gasoline engine to which the invention can be applied. An internal combustion engine 10 has a cylinder block 11 formed with a plurality of cylinders (bores) 11A and a cylinder head 12 fixedly connected onto the cylinder block 11. By the way, in FIG. 1, only one engine cylinder 11A is shown, but actually a plurality of engine cylinders 11A are juxtaposed to each other in the cylinder-row direction.

Pistons 15 are slidably installed in respective cylinders 11A. A combustion chamber 13 is defined between the upside of each piston 15 and the underside of the pent-roof type cylinder head 12. An intake port 17 is connected to each combustion chamber 13 through an intake valve 16. An exhaust port 19 is also connected to each of the combustion chambers through an exhaust valve 18. Furthermore, a spark plug 20 is installed at the center of the top of the combustion chamber 13 for spark-igniting a mixture (an air-fuel mixture).

An electronically-controlled throttle valve 23 is arranged upstream of an intake collector 22 and installed in an intake passage 21 connected to the intake port 17 of each engine cylinder for adjusting the amount of intake air (the intake-air quantity). A fuel injection valve 24 is also installed in the intake passage for injecting fuel toward the intake port 17 of each engine cylinder. By the way, the invention is not limited to such a port-injection type system configuration, but the invention may be applied to an in-cylinder direct-injection type system configuration. An airflow meter 25 is installed upstream of the throttle valve 23 for detecting the amount of intake air. An air filter 26 is also installed upstream of the throttle valve for trapping or collecting debris and impurities in the intake air.

A catalyst 31, such as a three way catalyst or the like, is interposed in an exhaust passage 30 into which exhaust ports 19 of each engine cylinder are connected and merged. An air-fuel ratio sensor 32, such as an oxygen concentration sensor, is installed upstream of the catalyst 31 for detecting an air/fuel ratio of exhaust gas. On the basis of a detection signal from the air-fuel ratio sensor 32, air/fuel ratio feedback control is performed to increase or decrease a fuel-injection quantity in order to maintain the air/fuel ratio of exhaust gas at a target air/fuel ratio (a stoichiometric air/fuel ratio).

Pistons 15 of each engine cylinder are connected through respective connecting rods 33 to a crankshaft 34. A crankangle sensor 35 is mounted on the cylinder block 11 for detecting a crankangle of the crankshaft 34. A knock sensor 36 is also mounted on the cylinder block 11 for detecting vibrations of the internal combustion engine.

As a variety of sensors/switches configured to detect engine operating conditions, in addition to the previously-discussed sensors, a water temperature sensor 37, an accelerator opening sensor 39, an ignition switch 40 and the like are further installed. The water temperature sensor is provided for detecting a temperature of coolant in a water jacket 38. The accelerator opening sensor is provided for detecting an accelerator opening APO of an accelerator pedal operated by the driver. The ignition switch is provided for starting and stopping the internal combustion engine. When the ignition switch 40, operated by the driver, is turned ON, a start request for the internal combustion engine is outputted. Conversely when the ignition switch 40 is turned OFF, a stop request for the internal combustion engine is outputted.

An ECU (an engine control unit) 41, which serves as control means, is equipped with a microcomputer having a function that stores and carries out various control processes. Responsively to input signals from various sensors/switches as discussed previously, the ECU is configured to output respective control signals to the throttle valve 23, spark plugs 20, fuel injection valves 24 and the like, for controlling their operations.

ECU 41 determines that knocking has occurred when a signal strength (a magnitude) of a knocking vibration frequency component (for example, 5-12 kHz) derived from an output signal from the knock sensor 36 exceeds a first predetermined threshold value SL1. More concretely, in order to more precisely detect knocking while discriminating the knocking from steady vibrations of the internal combustion engine, the ECU calculates a steady component from the past values of the knocking vibration frequency component, and also calculates a dynamic component of the knocking vibration frequency component by subtracting the calculated steady component from the latest up-to-date knocking vibration frequency component, and then determines that knocking has occurred when the magnitude of the calculated dynamic component exceeds the first threshold value SL1 (set or determined based on engine speed). By the way, as a method for determining the occurrence of knocking by comparing the magnitude of a knocking vibration frequency component with a threshold value, there are at least two methods to be considered, namely, one method being to compare the magnitude of the knocking vibration frequency component itself with the threshold value and the other method being to compare the magnitude of the dynamic component of the knocking vibration frequency component with the threshold value as previously discussed. In the invention, which of these methods may be used. In this manner, when the occurrence of knocking has been detected, ignition timing retard control or the like is executed so as to suppress or avoid the occurrence of knocking.

Figure 2:
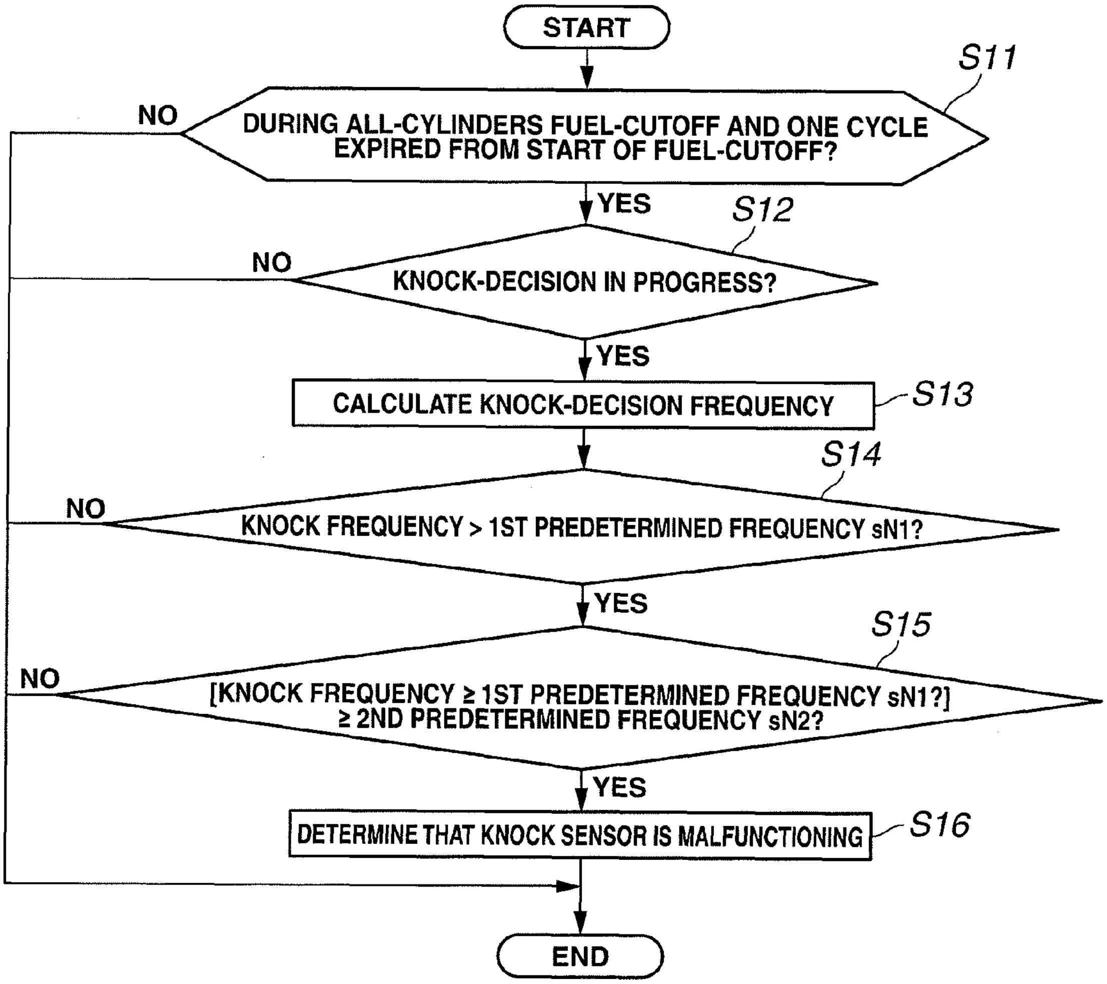
FIG. 2 is a flowchart showing the flow of knock-sensor malfunction diagnosis control of the first embodiment.

FIG. 2 is the flowchart showing the flow of malfunction-diagnosis processing for the knock sensor 36 in the embodiment. The routine is stored in the ECU 41 and repeatedly executed as time-triggered interrupt routines to be triggered every predetermined time intervals such as 10 msec.

At step S11, a check is made to determine whether a prescribed diagnostic condition wherein knocking cannot occur is satisfied. In the shown embodiment, a check is made to determine whether all of the engine cylinders are in their fuel-cutoff modes and a predetermined time period ΔB, concretely one cycle, has expired from the start of fuel-cutoff.

At step S12, a check is made to determine, based on the detection signal from the knock sensor 36, whether a knock-decision is in progress, that is, the occurrence of knocking has been detected. Concretely, when a signal strength (a magnitude) of a knocking vibration frequency component (e.g., 5-12 kHz) derived from an output signal from the knock sensor 36 abruptly rises and as a result the magnitude of the previously-discussed dynamic component exceeds a second predetermined threshold value SL2, the ECU determines or detects that knocking has occurred, and then the routine proceeds to step S13. In the shown embodiment, for the purpose of simplification of the control, the second threshold value SL2 is set to the same value as the previously-discussed first threshold value SL1 used for a knock-decision during normal operation. However, for the purpose of the enhanced diagnostic accuracy, the first threshold value may be set to a value greater than the second threshold value SL2 or a value less than the second threshold value depending on a diagnostic condition and the like.

At step S13, a knock-decision frequency is calculated. Concretely, the ECU counts the number of times (that is, the knock-decision frequency) that the magnitude of the knocking vibration frequency component exceeds the second threshold value SL2 every predetermined unit time periods ΔA. In the chart exemplified in FIG. 3, the unit time period ΔA is one second. In lieu thereof, the unit time period may be set to a different unit time or a different unit period, such as a predetermined crankangle.

Figure 3:
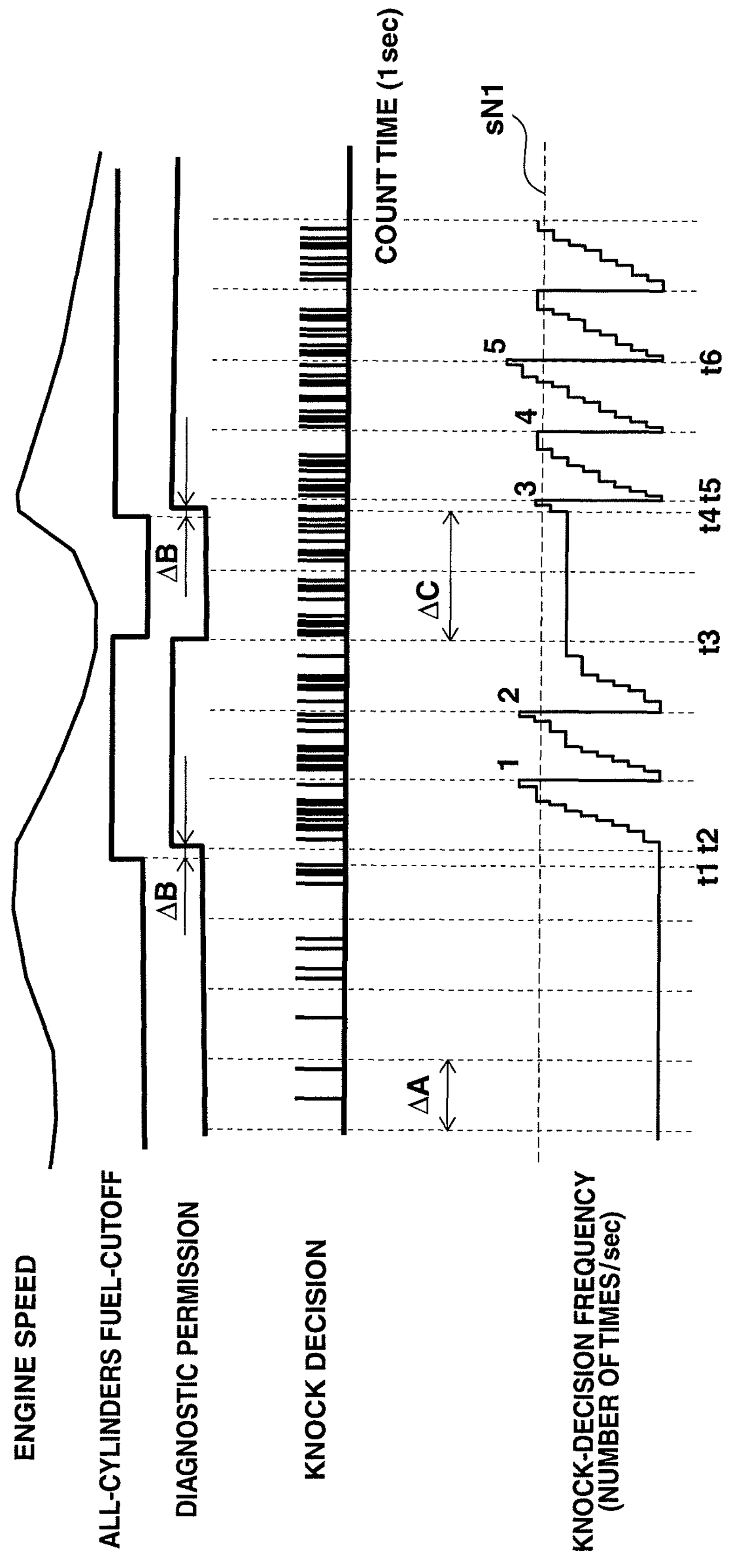
FIG. 3 is a timing chart showing a change in each characteristic value obtained when the malfunction diagnosis control of the first embodiment has been applied.

At step S14, a check is made to determine whether the knock-decision frequency (the knock-decision number of times in the unit time period ΔA) exceeds a first predetermined frequency sN1. In the shown embodiment, as shown in FIG. 3, the first predetermined frequency sN1 is eight times. In lieu thereof, the first predetermined frequency may be set to a different integer frequency.

At step S15, a check is made to determine whether a specified state, in which it has been determined through step S14 that the knock-decision frequency exceeds the first predetermined frequency sN1, has occurred continuously a second predetermined frequency sN2 or more. When the specified state, in which the knock-decision frequency exceeds the first predetermined frequency sN1, has occurred continuously the second predetermined frequency sN2 or more, the routine proceeds from step S15 to step S16. At this step, it is determined that the knock sensor 36 is malfunctioning. In this manner, in the case that a malfunction in the knock sensor 36 has been decided, a warning system, such as a warning light or a buzzing sound, informs the driver of a warning that the knock sensor 36 is malfunctioning. At the same time, control processing, such as ignition timing control that uses the detection signal from the knock sensor 36, is switched to an appropriate fail-safe mode.

FIG. 3 is the timing chart showing a change in each characteristic value obtained when the control of the embodiment has been applied. A diagnostic permission for the knock sensor 36 becomes ON (enabled) at a point of time t2, t5 when a predetermined time period ΔB (one cycle in the embodiment) has expired from an all-cylinders fuel-cutoff starting point t1, t4, and hence the routine of FIG. 2 proceeds from step S11 to step S12. Thus, a malfunction diagnosis for the knock sensor 36 is carried out. During the malfunction diagnosis, as discussed previously, at a point of time t6 when the specified state, in which the knock-decision number of times (that is, the knock frequency) in the unit time period ΔA exceeds the first predetermined frequency sN1 (eight times in the embodiment), has occurred continuously the second predetermined frequency sN2 (five times in the embodiment) or more, a diagnosis or a decision that the knock sensor 36 is malfunctioning is made.

By the way, in the chart exemplified in FIG. 3, it seems that the time interval from the time (the second knock frequency decision when the specified state for the knock frequency decision has continuously occurred twice to the time (the third knock frequency decision) when the specified state for the knock frequency decision has continuously occurred thrice is discrete or discontinuous. However, under the malfunction-diagnosis permission condition except for the time period ΔC from the time t3 to the time t4, during which all-cylinders fuel-cutoff is temporarily OFF (disabled), the specified state for the knock frequency decision has continuously occurred five times or more, that is, the second predetermined frequency sN2 or more.

As discussed above, in the embodiment, when the magnitude of the knocking vibration frequency component derived from the knock-sensor output signal exceeds the second threshold value SL2 under the prescribed diagnostic condition wherein knocking cannot occur, more concretely, when the specified state, in which the knock-decision frequency that the magnitude of the knocking vibration frequency component exceeds the second threshold value SL2 exceeds the first predetermined frequency sN1, has occurred continuously the second predetermined frequency sN2 or more, a diagnosis or a decision that the knock sensor 36 is malfunctioning is made. Therefore, it is possible to detect a malfunction/failure of a type wherein the output from the knock sensor 36 becomes excessively large. Also, it is possible to apply almost the same control processing as the normal knocking-occurrence detection processing that uses the first threshold value SL1 to the malfunction-diagnosis processing that uses the second threshold value SL2. Hence, it is possible to carry out such a malfunction diagnosis with a very simple control logic.

FIGS. 4, 5 and 7-9 are the flowcharts showing respective control flows of malfunction-diagnosis processing for the knock sensor 36 in the second embodiment to the sixth embodiment. The second to sixth embodiments are different from the first embodiment in that, regarding a decision process as to whether a prescribed diagnostic condition wherein knocking cannot occur is satisfied or unsatisfied, respective steps S11A-S11E are executed in place of step S11 of the first embodiment. By the way, the other configuration is similar to the first embodiment, and thus detailed description of the similar configuration will be omitted because the above description thereon seems to be self-explanatory.

Figure 4:
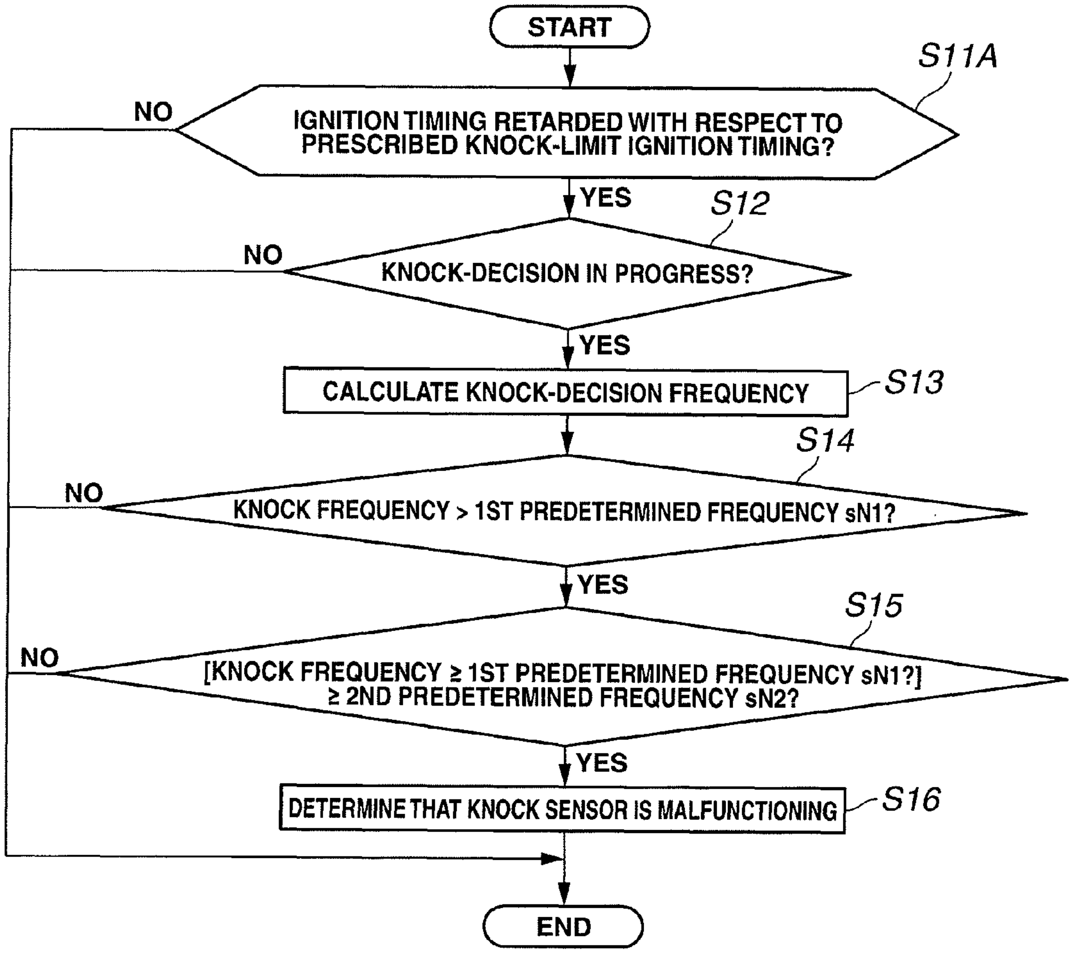
FIG. 4 is a flowchart showing the flow of knock-sensor malfunction diagnosis control of the second embodiment of the invention.

In the second embodiment shown in FIG. 4, as the diagnostic condition wherein knocking cannot occur, at step S11A, a check is made to determine whether ignition timing is retarded with respect to a prescribed knock-limit ignition timing. For instance, the knock-limit ignition timing can be retrieved or determined from a preset control map showing how the knock-limit ignition timing has to be varied relative to parameters, such as engine speed and engine load. When ignition timing is retarded with respect to the knock-limit ignition timing, it is determined that the diagnostic condition wherein knocking cannot occur is satisfied. Thus, the routine proceeds on and after step S12. Conversely when ignition timing is not retarded with respect to the knock-limit ignition timing, it is determined that the diagnostic condition wherein knocking cannot occur is unsatisfied. Thus, this routine terminates.

Figure 5:
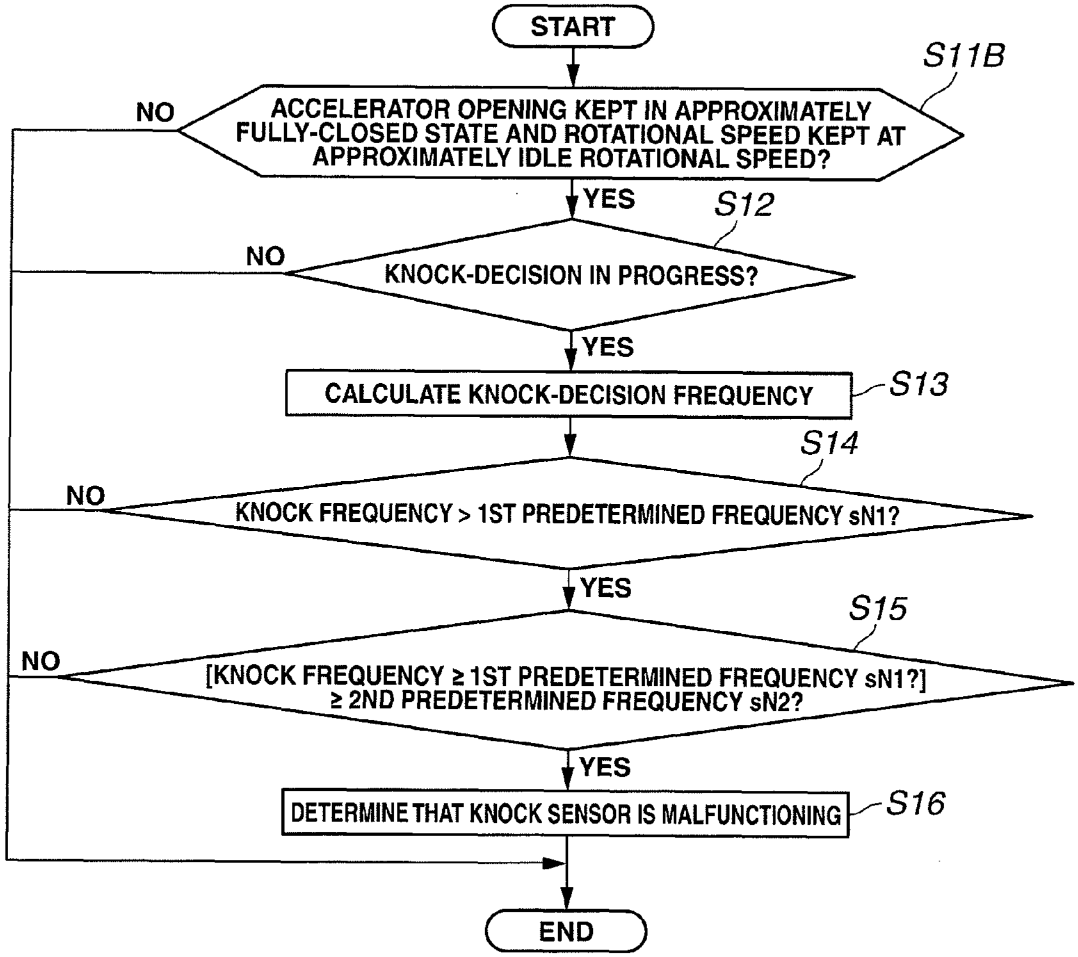
FIG. 5 is a flowchart showing the flow of knock-sensor malfunction diagnosis control of the third embodiment of the invention.

In the third embodiment shown in FIG. 5, as the diagnostic condition wherein knocking cannot occur, at step S11B, a check is made to determine whether the engine is running at idle. More concretely, when the accelerator opening is kept in an approximately fully-closed state and engine speed is kept at an approximately idle rotational speed, it is determined that the engine is running at idle and the diagnostic condition wherein knocking cannot occur is satisfied. Thus, the routine proceeds on and after step S12. Conversely when the engine is not running at idle, it is determined that the diagnostic condition wherein knocking cannot occur is unsatisfied. Thus, this routine terminates.

Figure 6:
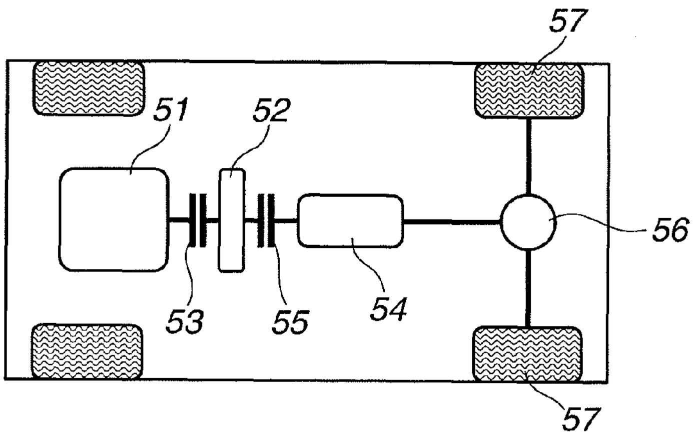
FIG. 6 is a block diagram illustrating the configuration of a hybrid vehicle to which the fourth embodiment of the invention can be applied.

FIG. 6 is the general block diagram illustrating the overall configuration of a hybrid vehicle to which the fourth embodiment of the invention can be applied. The hybrid vehicle is a so-called one-motor two-clutch parallel hybrid vehicle in which an internal combustion engine 51 and a motor/generator 52, both used as a propelling power source, are connected in series with each other through a first clutch 53. A second clutch 55 is interposed between the motor-generator 52 and an automatic transmission 54. Automatic transmission 54 is connected through a differential gear 56 to drive road wheels 57.

In such a hybrid vehicle, even when the ignition switch 40 (see FIG. 1), which is used for starting and stopping the internal combustion engine 51, is turned ON, that is, a start request for the internal combustion engine 51 is outputted from the ignition switch 40 operated by the driver, the internal combustion engine 51 can be automatically stopped so as to enable the vehicle running (vehicle propulsion) by only the motor/generator 52. For instance, during a so-called idle-stop (idle-reduction) mode, to improve fuel economy, the internal combustion engine 51 is automatically stopped with the ignition switch 40 turned ON. By the way, the vehicle to which the fourth embodiment can be applied, is not limited to a hybrid vehicle discussed previously, but the fourth embodiment may be applied to other types of automotive vehicles configured to be able to realize idle-stop control that automatically stops the internal combustion engine 51 during idling operation and also configured to use only the internal combustion engine 51 as a propelling power source.

Figure 7:
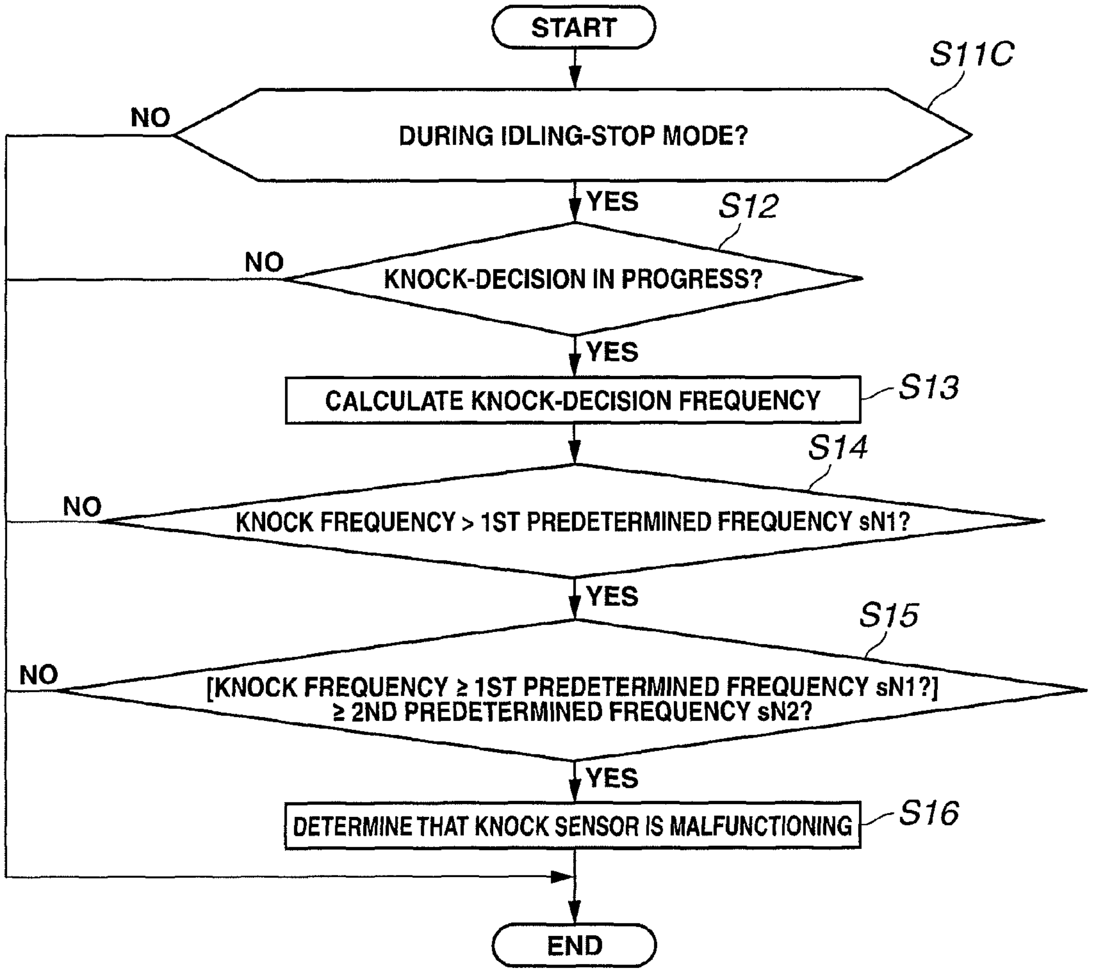
FIG. 7 is a flowchart showing the flow of knock-sensor malfunction diagnosis control of the fourth embodiment.

In the fourth embodiment, as shown in FIG. 7, as the diagnostic condition wherein knocking cannot occur, at step S11C, a check is made to determine whether the engine is in an idling-stop mode. More concretely, a check is made to determine whether the ignition switch 40 is turned ON but the internal combustion engine 51 is automatically stopped. When it is determined that the engine is in an idling-stop mode and hence the diagnostic condition wherein knocking cannot occur is satisfied, the routine proceeds on and after step S12. Conversely when the engine is out of an idling-stop mode and hence the diagnostic condition wherein knocking cannot occur is unsatisfied, this routine terminates.

Figure 8:
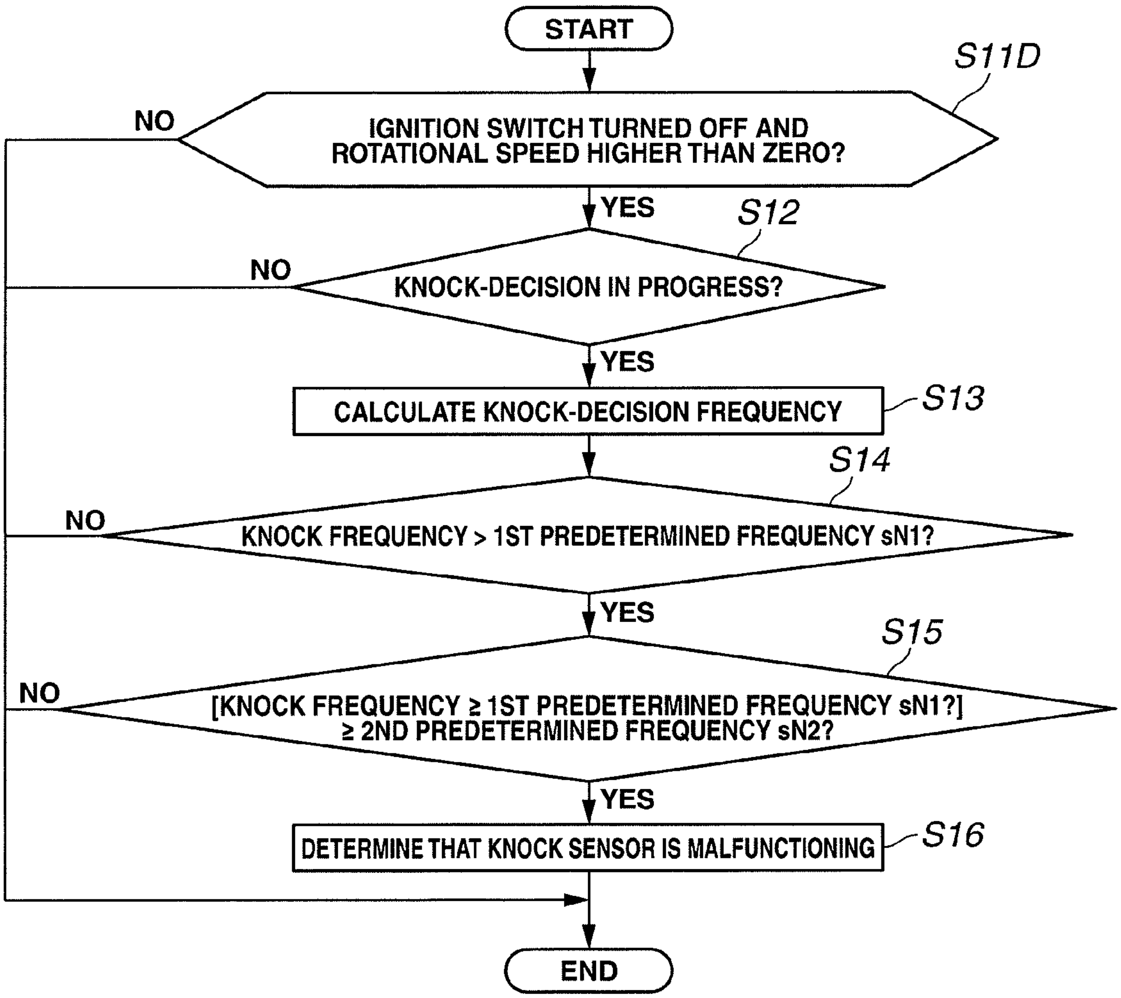
FIG. 8 is a flowchart showing the flow of knock-sensor malfunction diagnosis control of the fifth embodiment of the invention.

In the fifth embodiment shown in FIG. 8, as the diagnostic condition wherein knocking cannot occur, at step S11D, a check is made to determine whether the ignition switch 40 is turned OFF and a rotational speed (engine speed) is higher than "0". Concretely, a check is made to determine whether the engine is brought closer to a stop state during an engine-stopping period from the time when engine-stop processing for the internal combustion engine has been initiated by turning the ignition switch 40 OFF by the driver to the time when the internal combustion engine actually stops rotating, that is, during inertia rotation of the crankshaft 34. A decision for the engine-stopping period for stopping rotation of the internal combustion engine is made based on a detection signal from the above-mentioned crankangle sensor 35 or the like. During the time period from the time when the ignition switch 40 has been turned OFF to the time when the internal combustion engine stops rotating, it is determined that the diagnostic condition wherein knocking cannot occur is satisfied. Thus, the routine proceeds to step S12.

Figure 9:
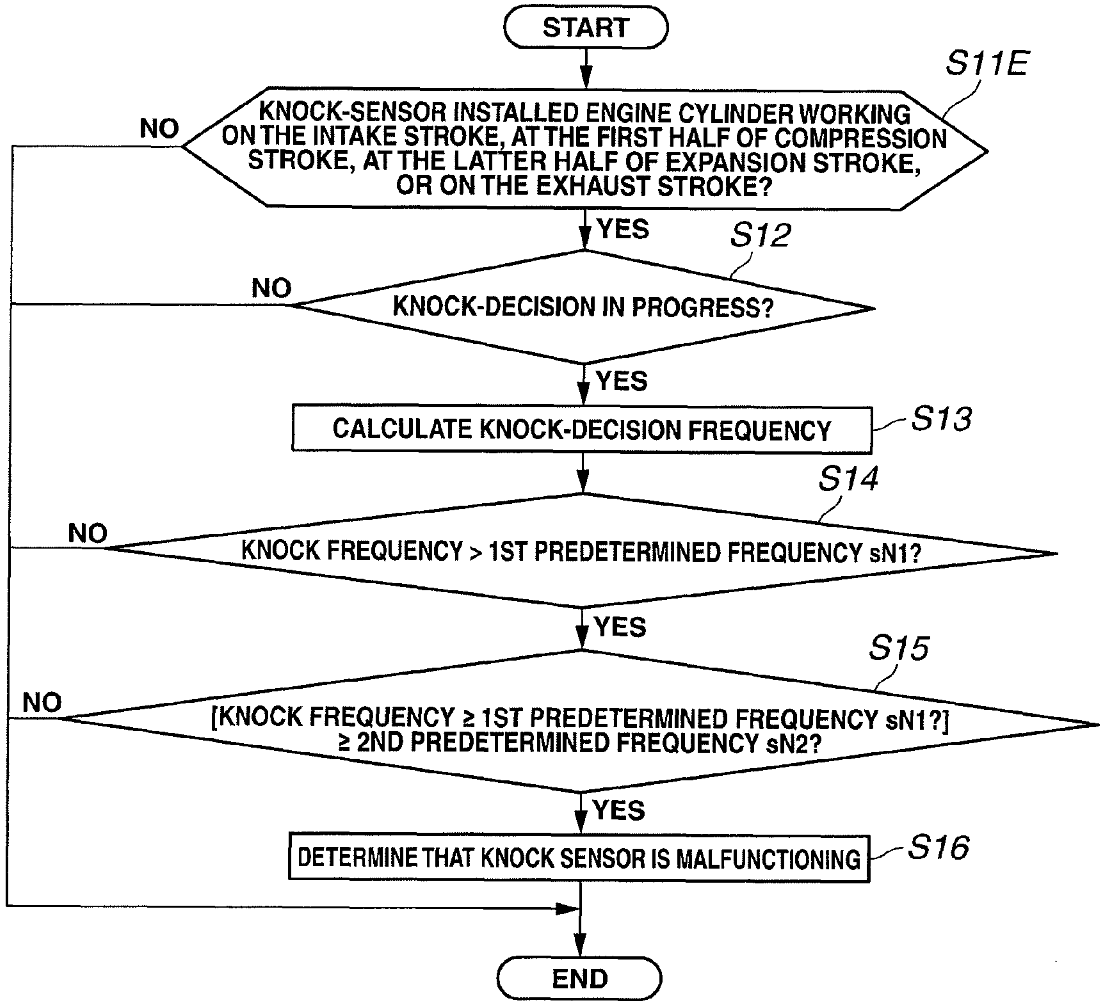
FIG. 9 is a flowchart showing the flow of knock-sensor malfunction diagnosis control of the sixth embodiment of the invention.

In the sixth embodiment shown in FIG. 9, knock sensor 36 is installed or located at a position of the cylinder block 11 closer to a specified engine cylinder for detecting vibrations of the specified engine cylinder. As the diagnostic condition wherein knocking cannot occur, at step S11E, a check is made to determine whether the piston stroke of the specified engine cylinder is the timing when combustion in the specified engine cylinder is not carried out. Concretely, a check is made to determine whether the piston of the specified engine cylinder is moving on the intake stroke, at the first half on the compression stroke, at the latter half of the expansion stroke, or on the exhaust stroke. When the piston of the specified engine cylinder is moving on the intake stroke, at the first half on the compression stroke, at the latter half of the expansion stroke, or on the exhaust stroke, it is determined that the diagnostic condition wherein knocking cannot occur is satisfied. Thus, the routine proceeds to step S12.

By the way, regarding the diagnostic conditions, as explained previously in reference to the first to fifth embodiments, wherein knocking cannot occur, some of them may be suitably combined with each other. In such a case, it is possible to increase the frequency/opportunity of executions of a malfunction diagnosis.

The invention claimed is:

1. A knock-sensor malfunction diagnosis device, comprising:

a knock sensor for detecting a vibration of an internal combustion engine;

a control means for determining that knocking has occurred when a magnitude of a knocking vibration frequency component derived from an output signal from the knock sensor exceeds a first threshold value, and the control means configured to:

determine whether a prescribed diagnostic condition wherein knocking cannot occur is satisfied, diagnose the knock sensor as malfunctioning when the diagnostic condition is satisfied and the magnitude of the knocking vibration frequency component derived from the output signal from the knock sensor exceeds a second threshold value, and determine that the diagnostic condition is satisfied for a time interval from a point of time when a predetermined time period has expired after fuel-cutoff has started to a point of time when the fuel-cutoff ends, during execution of the fuel-cutoff.

2. A knock-sensor malfunction diagnosis device as recited in claim 1, wherein:

the first threshold value and the second threshold value are identical to each other.

3. A knock-sensor malfunction diagnosis device as recited in claim 1, wherein:

the control means is configured to:

count the number of times that the magnitude of the knocking vibration frequency component exceeds the second threshold value every predetermined unit time periods when the diagnostic condition has been satisfied, and diagnose the knock sensor as malfunctioning when the counted number of times exceeds a first predetermined frequency.

4. A knock-sensor malfunction diagnosis device as recited in claim 3, wherein:

the control means is configured to diagnose the knock sensor as malfunctioning when a specified state in which the counted number of times exceeds the first predetermined frequency, has occurred continuously a second predetermined frequency.

5. A knock-sensor malfunction diagnosis method for a knock sensor for detecting a vibration of an internal combustion engine, comprising:

determining that knocking has occurred when a magnitude of a knocking vibration frequency component derived from an output signal from the knock sensor exceeds a first threshold value;

determining that a prescribed diagnostic condition wherein knocking cannot occur is satisfied for a time interval from a point of time when a predetermined time period has expired after fuel-cutoff has started to a point of time when the fuel-cutoff ends, during execution of the fuel-cutoff; and diagnosing the knock sensor as malfunctioning when the diagnostic condition is satisfied and the magnitude of the knocking vibration frequency component derived from the output signal from the knock sensor exceeds a second threshold value.

6. A knock-sensor malfunction diagnosis device, comprising:

a knock sensor for detecting a vibration of an internal combustion engine; and a control section configured to:

determine that knocking has occurred when a magnitude of a knocking vibration frequency component derived from an output signal from the knock sensor exceeds a first threshold value, determine whether a prescribed diagnostic condition wherein knocking cannot occur is satisfied, diagnose the knock sensor as malfunctioning when the diagnostic condition is satisfied and the magnitude of the knocking vibration frequency component derived from the output signal from the knock sensor exceeds a second threshold value, and determine that the diagnostic condition is satisfied for a time interval from a point of time when a predetermined time period has expired after fuel-cutoff has started to a point of time when the fuel-cutoff ends, during execution of the fuel-cutoff.

7. A knock-sensor malfunction diagnosis device as recited in claim 6, wherein:

the first threshold value and the second threshold value are identical to each other.

8. A knock-sensor malfunction diagnosis device as recited in claim 6, wherein:

the control section is configured to:

count the number of times that the magnitude of the knocking vibration frequency component exceeds the second threshold value every predetermined unit time periods when the diagnostic condition has been satisfied, and diagnose the knock sensor as malfunctioning when the counted number of times exceeds a first predetermined frequency.

9. A knock-sensor malfunction diagnosis device as recited in claim 8, wherein:

the control section is configured to diagnose the knock sensor as malfunctioning when a specified state in which the counted number of times exceeds the first predetermined frequency, has occurred continuously a second predetermined frequency.

* * * * *